(12) United States Patent
Yokoi et al.

(10) Patent No.: US 10,202,030 B2
(45) Date of Patent: Feb. 12, 2019

(54) POWER GENERATION APPARATUS INCLUDING INTERNAL COMBUSTION ENGINE AND ROTARY ELECTRIC MACHINE DISPOSED ADJACENT THERETO

(71) Applicant: HONDA MOTOR CO., LTD., Tokyo (JP)

(72) Inventors: Masashi Yokoi, Utsunomiya (JP); Yusuke Ozaki, Utsunomiya (JP); Yoshikazu Ishigaki, Utsunomiya (JP); Atsushi Sato, Utsunomiya (JP); Hiroaki Sato, Takanezawa-machi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 307 days.

(21) Appl. No.: 15/032,466

(22) PCT Filed: Oct. 31, 2014

(86) PCT No.: PCT/JP2014/079019
§ 371 (c)(1),
(2) Date: Apr. 27, 2016

(87) PCT Pub. No.: WO2015/064730
PCT Pub. Date: May 7, 2015

(65) Prior Publication Data
US 2016/0243926 A1  Aug. 25, 2016

(30) Foreign Application Priority Data

Nov. 1, 2013  (JP) .................................. 2013-228350

(51) Int. Cl.
*H02K 5/22*  (2006.01)
*B60K 6/22*  (2007.10)
(Continued)

(52) U.S. Cl.
CPC ................. *B60K 6/22* (2013.01); *B60K 6/26* (2013.01); *B60K 6/40* (2013.01); *B60K 6/405* (2013.01);
(Continued)

(58) Field of Classification Search
CPC ..................... H02K 5/22; H02K 5/225; H02K 3/52–3/528; B60K 6/26
(Continued)

(56) References Cited

U.S. PATENT DOCUMENTS 5,090,502 A * 2/1992 Inoue .................... B60K 5/1291
180/292
6,481,517 B1 * 11/2002 Kobayashi ............... B60K 6/26
180/65.26
(Continued)

FOREIGN PATENT DOCUMENTS

CN  1550059 A   11/2004
CN  101682227 A   3/2010
(Continued)

OTHER PUBLICATIONS

International Search Report dated Feb. 3, 2015, issued in counterpart International Application No. PCT/JP2014/079019 (2 pages).
(Continued)

*Primary Examiner* — Thomas Truong
(74) *Attorney, Agent, or Firm* — Westerman, Hattori, Daniels & Adrian, LLP

(57) ABSTRACT

Provided is a power generation apparatus, which includes an internal combustion engine, and a rotary electric machine disposed adjacent to the internal combustion engine in an axial direction. The rotary electric machine includes coils to which an electric current is supplied from an external power apparatus via an electric power supply cable. Terminal parts connected to the coils and connection terminals of the
(Continued)

electric power supply cable are connected in a predetermined connection space that is formed in part of a lower block of an engine block of the internal combustion engine.

9 Claims, 17 Drawing Sheets

(51) Int. Cl.
    *B60K 6/40*         (2007.10)
    *B60K 6/485*       (2007.10)
    *B60L 11/14*       (2006.01)
    *H02K 7/18*        (2006.01)
    *B60K 6/26*        (2007.10)
    *F02F 7/00*         (2006.01)
    *B60K 6/405*       (2007.10)
    *B60K 6/54*        (2007.10)
    *F02F 1/00*         (2006.01)

(52) U.S. Cl.
    CPC ............... *B60K 6/485* (2013.01); *B60K 6/54* (2013.01); *B60L 11/14* (2013.01); *F02F 1/00* (2013.01); *F02F 7/00* (2013.01); *F02F 7/0065* (2013.01); *H02K 5/22* (2013.01); *H02K 5/225* (2013.01); *H02K 7/1815* (2013.01); *B60Y 2200/92* (2013.01); *B60Y 2410/115* (2013.01); *Y02T 10/6226* (2013.01); *Y02T 10/641* (2013.01); *Y02T 10/70* (2013.01); *Y02T 10/7077* (2013.01); *Y10S 903/904* (2013.01)

(58) Field of Classification Search
    USPC ...................................................... 310/71, 89
    See application file for complete search history.

(56) References Cited

U.S. PATENT DOCUMENTS

| | | | |
|---|---|---|---|
| 2002/0043883 A1 | 4/2002 | Shimizu | |
| 2004/0206558 A1* | 10/2004 | Kabasawa | B60K 6/26 180/65.25 |
| 2006/0220479 A1* | 10/2006 | Hasegawa | B60K 6/26 310/85 |
| 2008/0088190 A1 | 4/2008 | Ideshio | |
| 2012/0057929 A1 | 3/2012 | Kasuga et al. | |

FOREIGN PATENT DOCUMENTS

| | | |
|---|---|---|
| DE | 199 39 604 A1 | 3/2001 |
| JP | 2001-25198 A | 1/2001 |
| JP | 2004-122980 A | 4/2004 |
| JP | 2004-136743 A | 5/2004 |
| JP | 3646856 B | 5/2005 |
| JP | 2006-211774 A | 8/2006 |
| JP | 2009-261093 A | 11/2009 |
| JP | 2010-4659 A | 1/2010 |
| JP | 2010-265967 A | 11/2010 |
| JP | 2011-160619 A | 8/2011 |
| JP | 2012-120292 A | 6/2012 |
| JP | 2013-113100 A | 6/2013 |

OTHER PUBLICATIONS

Notice of Allowance dated Nov. 8, 2016, issued in counterpart Japanese Patent Application No. 2015-545318, with English translation. (6 pages).

Office Action dated Sep. 20, 2017, issued in counterpart Chinese Application No. 201480059068.5, with English translation (16 pages).

* cited by examiner

POWER GENERATION APPARATUS INCLUDING INTERNAL COMBUSTION ENGINE AND ROTARY ELECTRIC MACHINE DISPOSED ADJACENT THERETO

TECHNICAL FIELD

The present invention relates to a power generation apparatus.

Priority is claimed on Japanese Patent Application No. 2013-228350, filed on Nov. 1, 2013, the contents of which are incorporated herein by reference.

BACKGROUND ART

Conventionally, a hybrid vehicle drive in which a motor housed in a housing is coupled to a crankshaft between an internal combustion engine and a transmission is known (e.g., see Patent Literature 1).

CITATION LIST

Patent Literature

[Patent Literature 1]
  Japanese Patent No. 3646856

SUMMARY OF INVENTION

Technical Problem

Meanwhile, in the hybrid vehicle drive according to the prior art, when terminal parts for connecting a power supply cable to the motor are provided at an outer circumferential portion of the housing, there is a problem that, as an axial or radial size of the housing increases, the entire drive grows in size.

An aspect of the present invention was made in view of the above circumstances, and thus an object thereof is to provide a power generation apparatus capable of suppressing growth in size and inhibiting a special constitution from being required for a rotary electric machine connected to an internal combustion engine.

Solution to Problem

To address the above problem and accomplish the relevant object, the present invention employs the following aspects.

(1) A power generation apparatus according to an aspect of the present invention includes: an internal combustion engine; and a rotary electric machine disposed adjacent to the internal combustion engine in an axial direction. The rotary electric machine includes coils to which an electric current is supplied from an external power supply device via a power supply cable, and coil terminals connected to the coils and connection terminals of the power supply cable are connected in a predetermined connection space formed in part of the internal combustion engine.

(2) In the power generation apparatus described in aspect (1), the internal combustion engine may include an insertion part of a crankshaft which is configured by a pair of upper and lower blocks; part of an outer circumferential surface of the insertion part may bulge to a radial outer side and form a bulge; and the connection space may be formed in the bulge.

(3) In the power generation apparatus described in aspect (1) when viewed in the axial direction, the bulge may be formed at a radial outer side relative to the insertion part and at a radial inner side relative to an outer edge of a joint surface for another housing joined with the internal combustion engine.

(4) In the power generation apparatus described in aspect (2) or (3), the power supply cable may be inserted into the connection space in the axial direction.

(5) In the power generation apparatus described in any one of aspects (1) to (4), the rotary electric machine may include a stator around which the coils are wound and a rotor configured to face the stator in a radial direction, and the connection space may be disposed at a position shifted from the stator and the rotor in the axial direction.

(6) In the power generation apparatus described in any one of aspects (1) to (5), the connection space may include a window part configured to open at a location facing connection parts between the coil terminals and the connection terminals of the power supply cable.

(7) In the power generation apparatus described in any one of aspects (2) to (6), the connection space may be formed in the lower block of the internal combustion engine.

(8) In the power generation apparatus described in aspect (7), the connection space be sealed against an outside by a seal member.

(9) In the power generation apparatus described in aspect (1), wherein the rotary electric machine may be housed in part of the internal combustion engine.

Advantageous Effects of Invention

According to the power generation apparatus described in aspect (1), since the connection space is formed in part of the internal combustion engine, an increase in an axial dimension of the power generation apparatus can be suppressed.

That is, a predetermined width (a length in a connecting direction) is required for the connection space for connecting the coil terminals and the connection terminals. For this reason, for example, when the connection space is provided at the outer circumferential portion of the housing of the rotary electric machine, a width of this housing is equal to or greater than a predetermined value, and an axial or radial size of the entire power generation apparatus increases.

In contrast, as the connection space is formed in part of the internal combustion engine, a space directed toward the internal combustion engine can be efficiently used as provide the connection space, and an increase in size of the housing of the rotary electric machine can be suppressed, or the housing of the rotary electric machine can be obviated.

In the case of aspect (2), since the connection space can be formed using a space around the insertion part of the crankshaft of the internal combustion engine, the internal combustion engine and the rotary electric machine can be inhibited from growing in radial size.

In the case of aspect (3), since the connection space can be formed using a space that is present due to a difference in outer diameter between the insertion part of the crankshaft of the internal combustion engine and another housing of the rotary electric machine or the transmission, the internal combustion engine and the rotary electric machine can be inhibited from growing in radial size.

In the case of aspect (4), since the power supply cable can be disposed around the internal combustion engine or the rotary electric machine in an axial direction, the power generation apparatus including even the power supply cable can be inhibited from growing in size, for example, compared to the case in which the power supply cable is disposed in a radial direction.

In the case of aspect (5), the connection space and the stator and the rotor of the rotary electric machine can be prevented from overlapping in an axial direction when viewed in a radial direction, and the rotary electric machine can be inhibited from growing in radial size.

In the case of aspect (6), the coil terminals and the connection terminals of the power supply cable can be easily connected because they can gain access to the connection space through the window part.

In the case of aspect (7), since the connection space is formed at a lower position than an exhaust heat system position, a thermal action which the power supply cable receives from an exhaust heat system component can be suppressed.

In the case of aspect (8), even when the connection space is formed in the lower block, the connection parts can be prevented from being covered with fluid.

In the case of aspect (9), a dedicated housing is not required for the rotary electric machine, and the number of components can be reduced.

DESCRIPTION OF EMBODIMENTS

Figure 1:
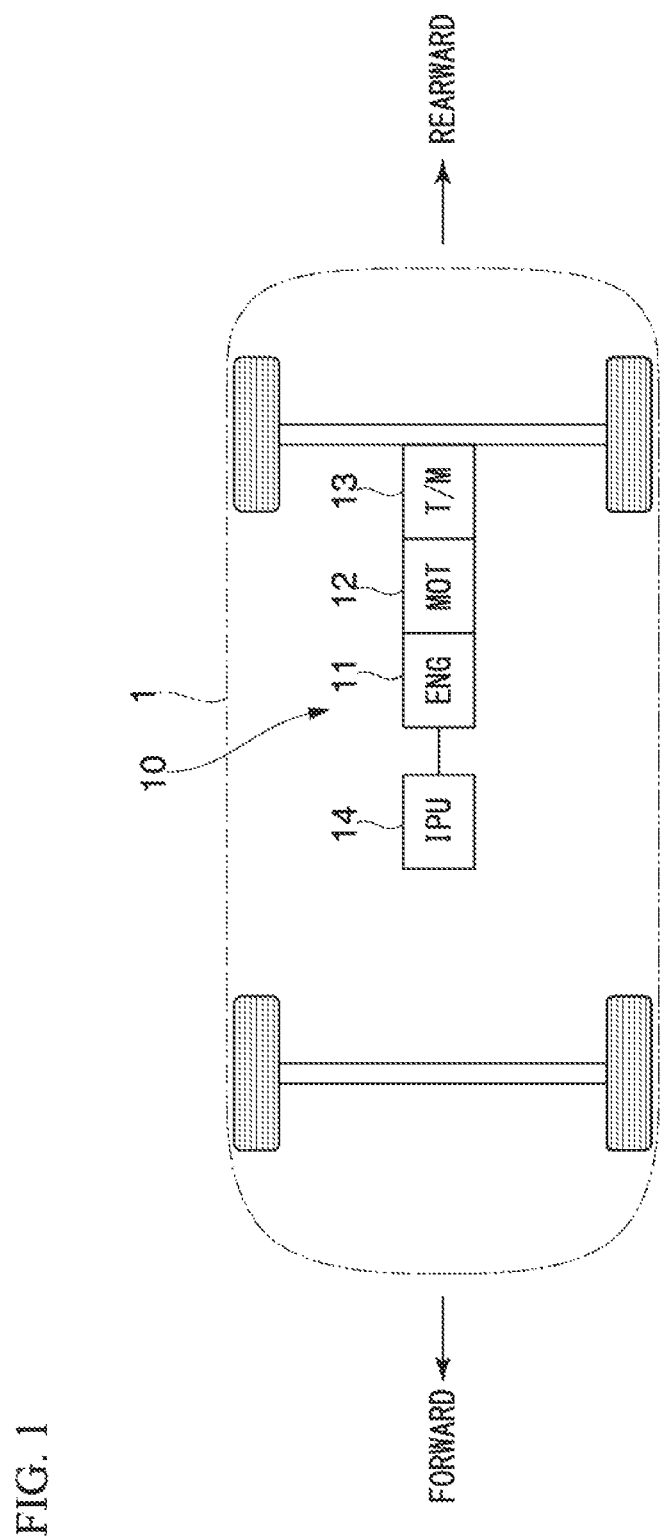
FIG. 1 is a constitution view of a hybrid vehicle in which a power generation apparatus according to an embodiment of the present invention is mounted.
Figure 2:
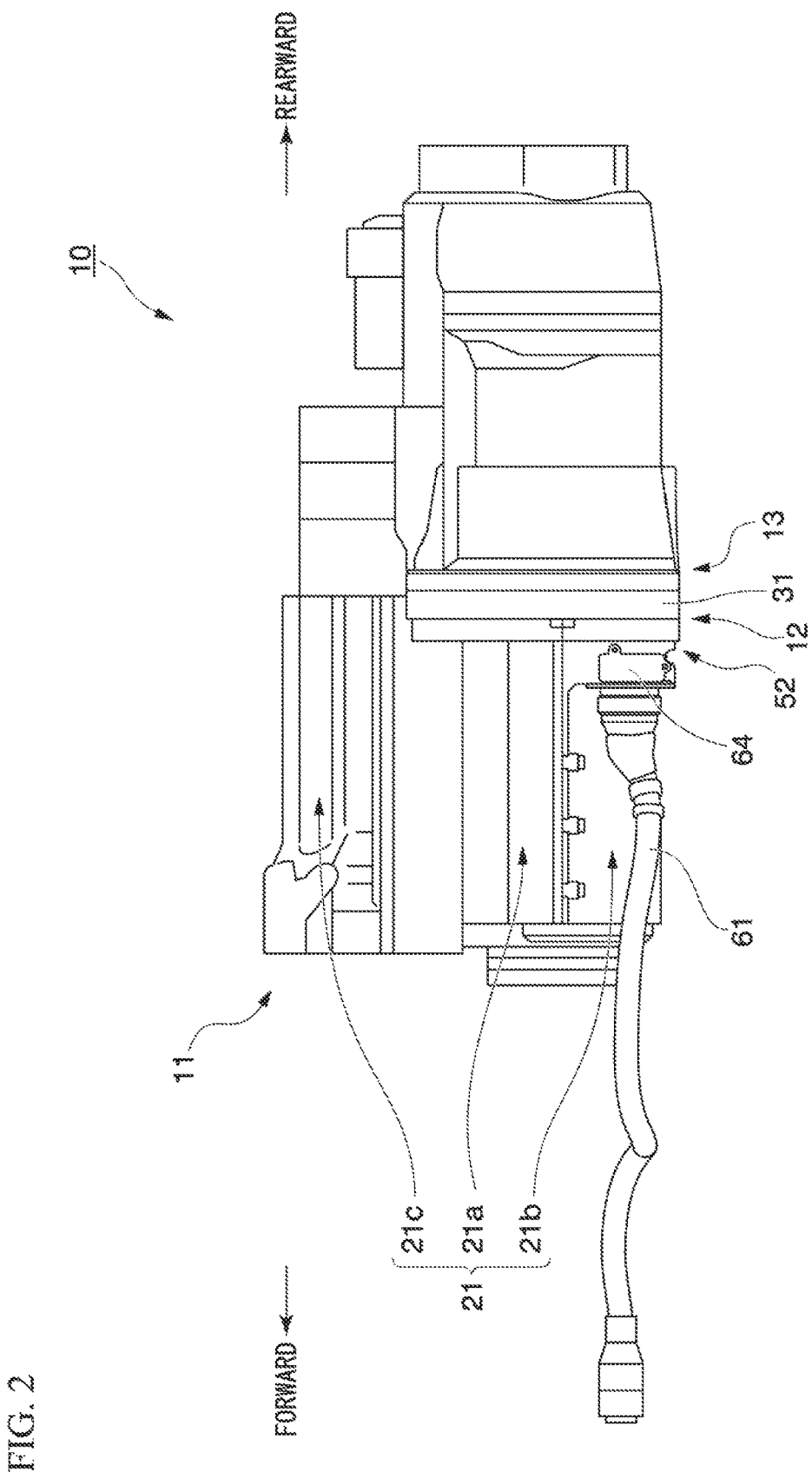
FIG. 2 is a side view of the power generation apparatus according to the embodiment of the present invention.
Figure 3:
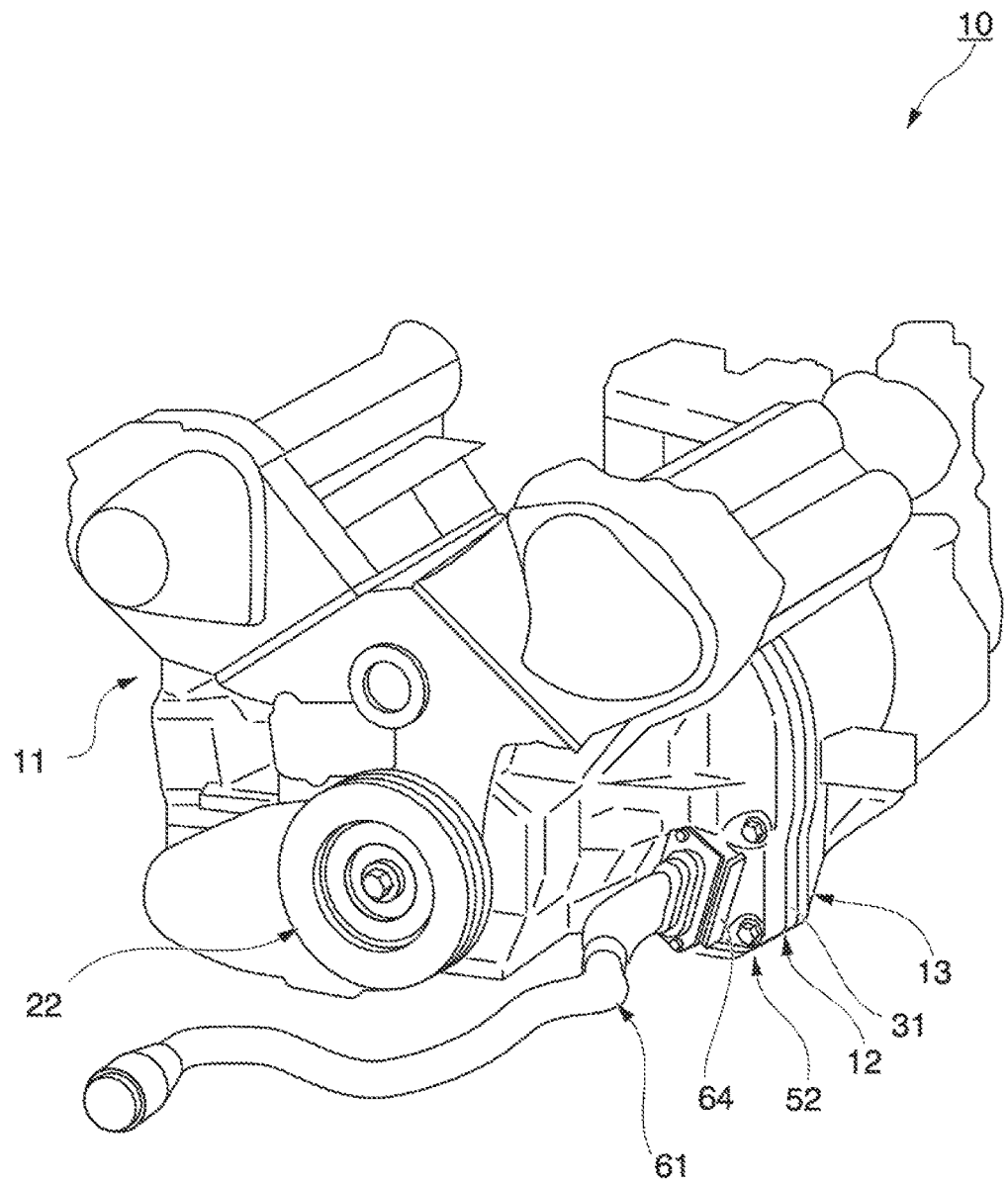
FIG. 3 is a perspective view of the power generation apparatus according to the embodiment of the present invention when viewed obliquely from a front side in an axial direction.

Hereinafter, a power generation apparatus according to an embodiment of the present invention will be described in detail with reference to the attached drawings, As illustrated in FIG. 1, a power generation apparatus 10 according to the present embodiment is mounted in a hybrid vehicle 1. As illustrated in FIGS. 1 to 3, the power generation apparatus 10 is equipped with an internal combustion engine (ENG) 11, a rotary electric machine or a motor (MOT) 12 that is disposed adjacent to the internal combustion engine 11 in an axial direction of a crankshaft (not illustrated) of the internal combustion engine 11, and a transmission (T/M) 13 that is disposed adjacent to the rotary electric machine 12 in the axial direction of the internal combustion engine 11. The internal combustion engine 11 and the transmission 13 are disposed to sandwich the rotary electric machine 12 from opposite sides of the internal combustion engine 11 in the axial direction. A rotary shaft (not illustrated) of the rotary electric machine 12 is coupled with the crankshaft (not illustrated) of the internal combustion engine 11 and an input shaft (not illustrated) of the transmission 13 at opposite ends thereof in an axial direction.

Figure 7:
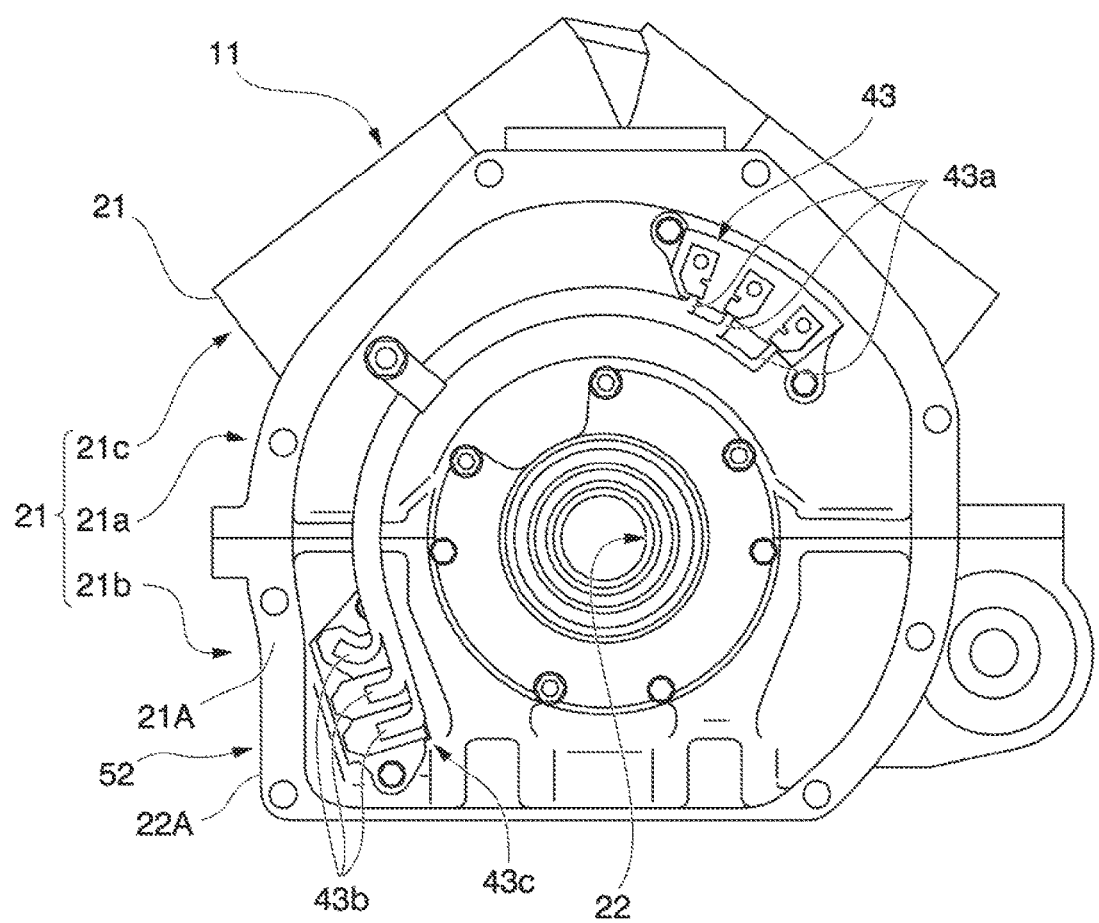
FIG. 7 is a top view of the internal combustion engine on which a power distribution component of the power generation apparatus according to the embodiment of the present invention is mounted when viewed from an axial rear side.
Figure 8:
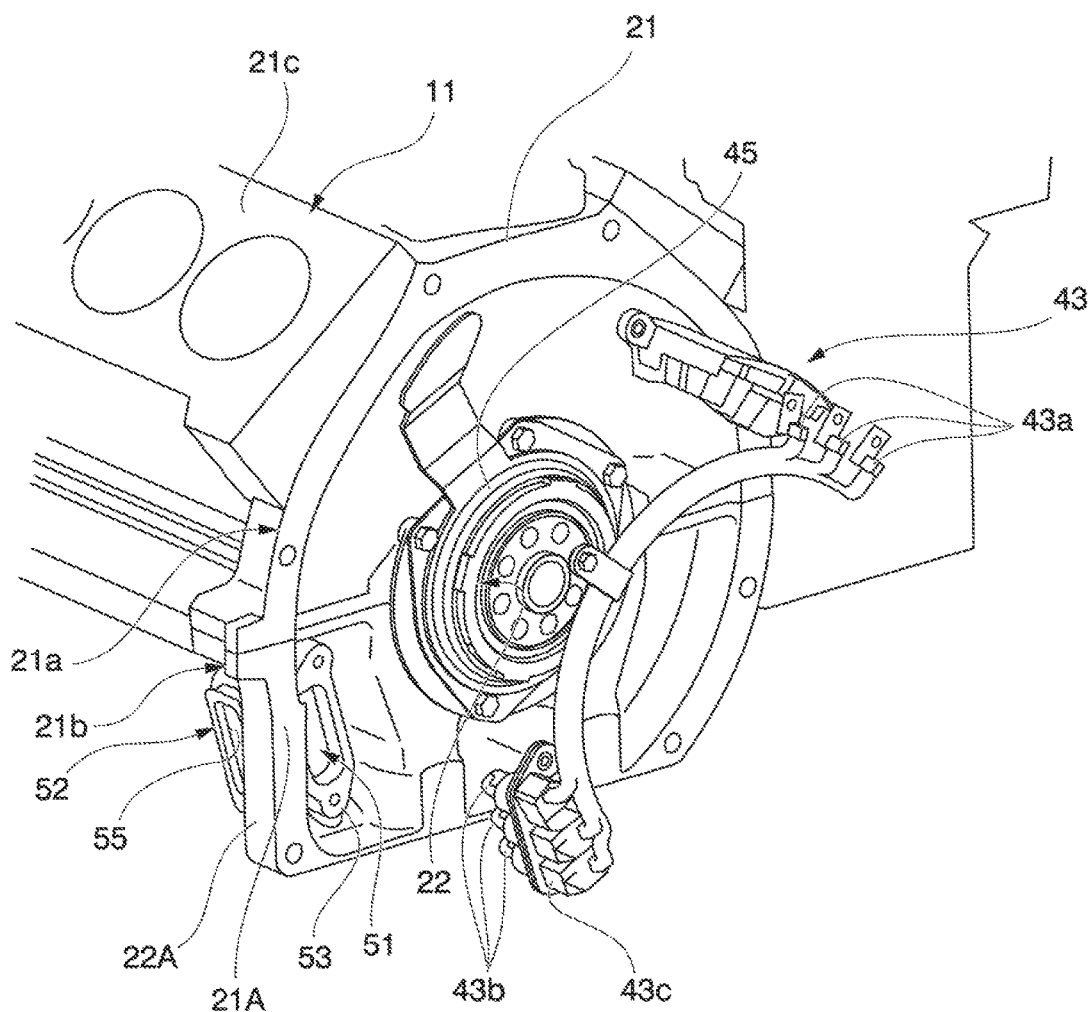
FIG. 8 is a perspective view of the internal combustion engine on which the power distribution component and a resolver of the power generation apparatus according to the embodiment of the present invention are mounted when viewed obliquely from the rear side in the axial direction.
Figure 9:
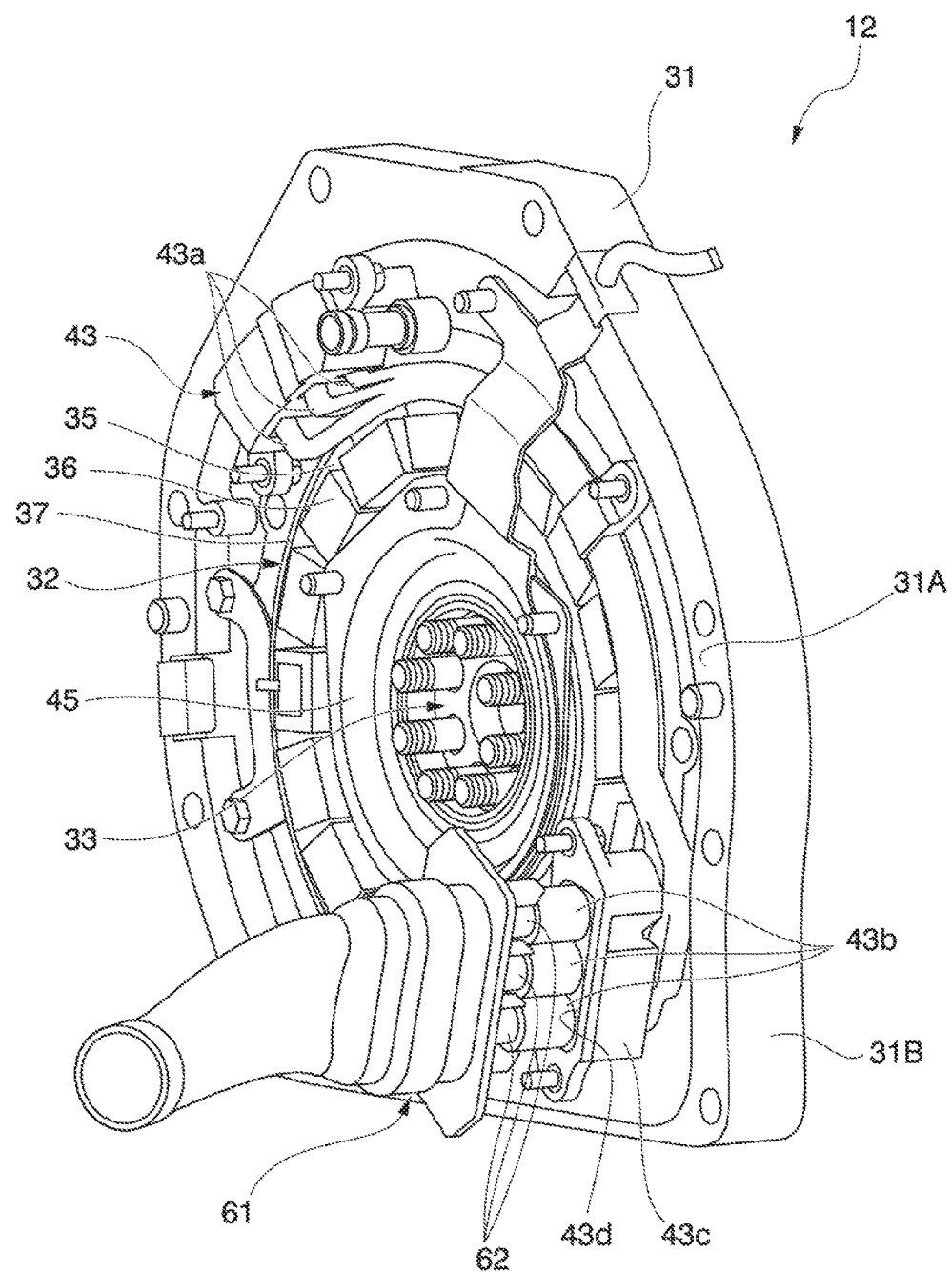
FIG. 9 is a perspective view of a connection part of the rotary electric machine of the power generation apparatus according to the embodiment of the present invention for the internal combustion engine when viewed obliquely from the front side in the axial direction.

The hybrid vehicle 1 illustrated in FIG. 1 sets, for instance, rear wheels as drive wheels, and an output shaft (not illustrated) of the transmission 13 is coupled to the rear wheels. The power generation apparatus 10 is disposed at a rear side relative to a power apparatus or an intelligent power unit (IPU) 14 equipped with an electrical storage device that is a power source for current conduction to the rotary electric machine 12, a power converter, and the like in a longitudinal direction of the hybrid vehicle 1. In the power generation apparatus 10, the internal combustion engine 11, the rotary electric machine 12, and the transmission 13 are sequentially arranged from a front side toward the rear side with the axial direction of the internal combustion engine 11 parallel to the vehicle longitudinal direction, As illustrated in FIGS. 4 to 8, the internal combustion engine 11 is, for instance, a V6 engine, and is equipped with an engine block (or a cylinder block) 21 constituted of a pair of upper and lower blocks 21a and 21b and a cylinder head 21c. The engine block 21 is equipped with an insertion part 22 of the crankshaft (not illustrated) which is formed by the upper block 21a and the lower block 21b. The cylinder head 21c is mounted on an upper portion of the upper block 21a, and constitutes cylinders (not illustrated) in which pistons (not illustrated) are housed along with the upper block 21a. As illustrated in FIGS. 7 to 9, the engine block 21 has a joint surface 21A coming into contact with a joint surface 31A of a housing structure 31 of the rotary electric machine 12, and is joined to the housing structure 31 of the rotary electric machine 12 by, for instance, bolting in a state in which this joint surface 21A is in contact with the joint surface 31A of the housing structure 31.

Figure 4:
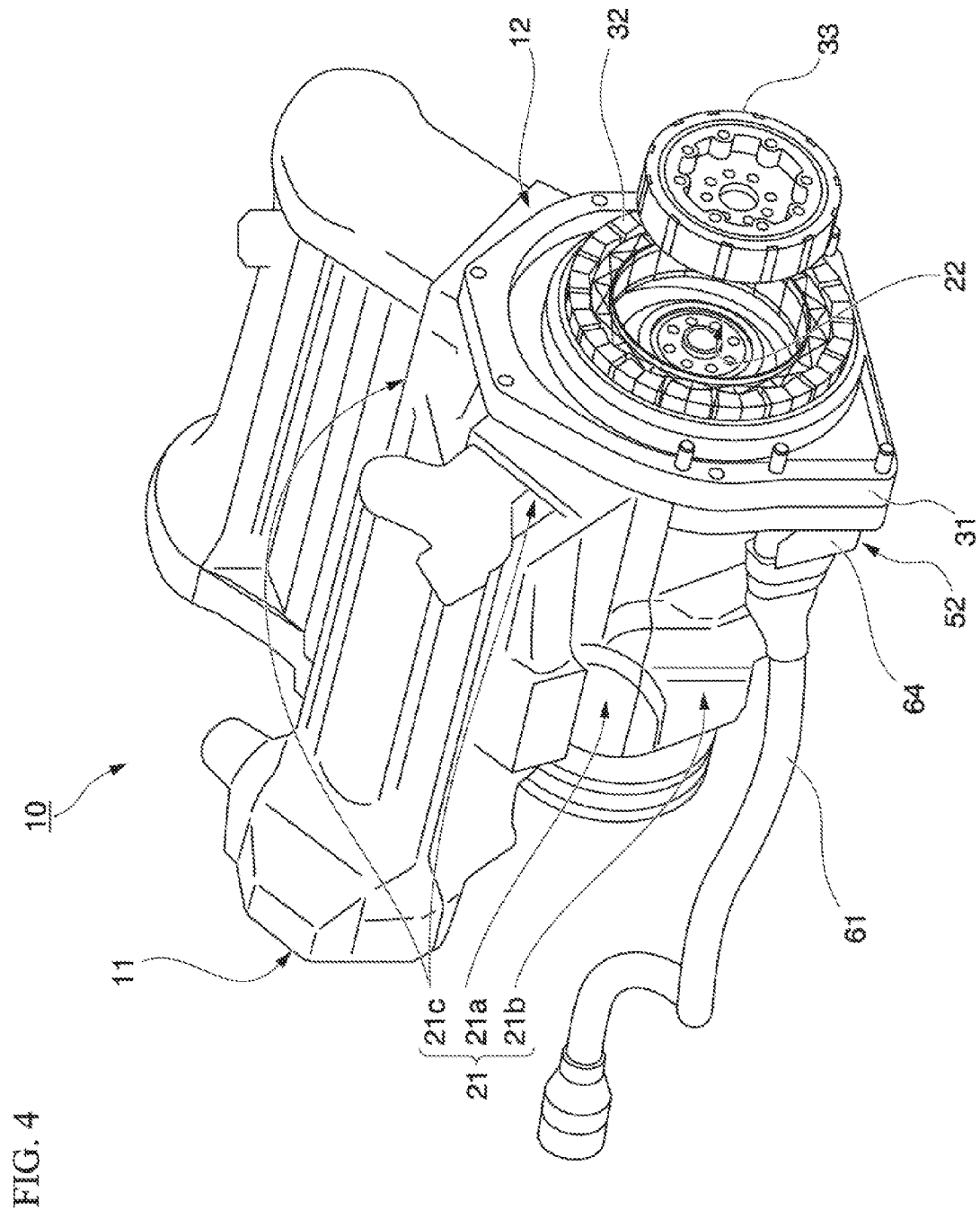
FIG. 4 is a perspective view of a rotary electric machine and an internal combustion engine of the power generation apparatus according to the embodiment of the present invention when viewed obliquely from a rear side in the axial direction.
Figure 10:
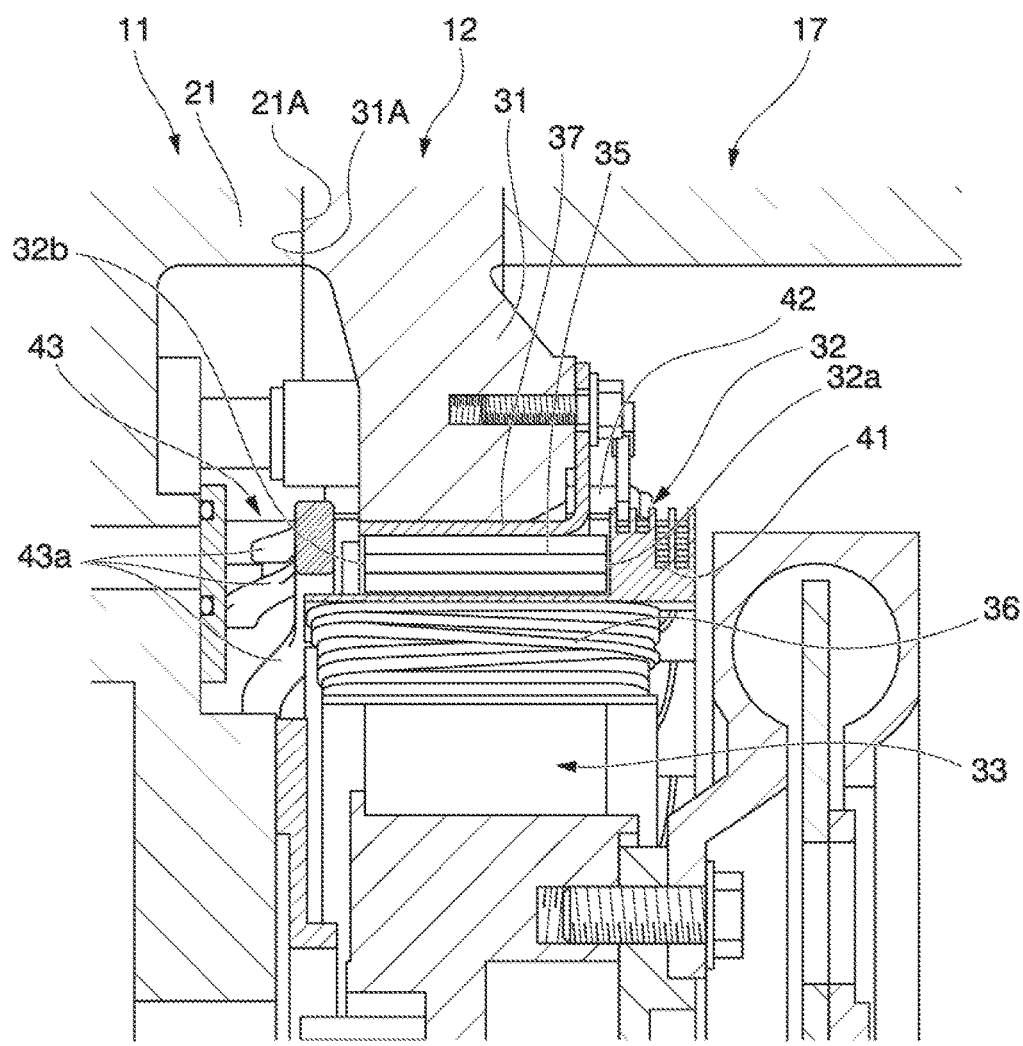
FIG. 10 is a side view of connection parts between coil ends of the rotary electric machine and the power distribution component of the power generation apparatus according to the embodiment of the present invention.
Figure 11:
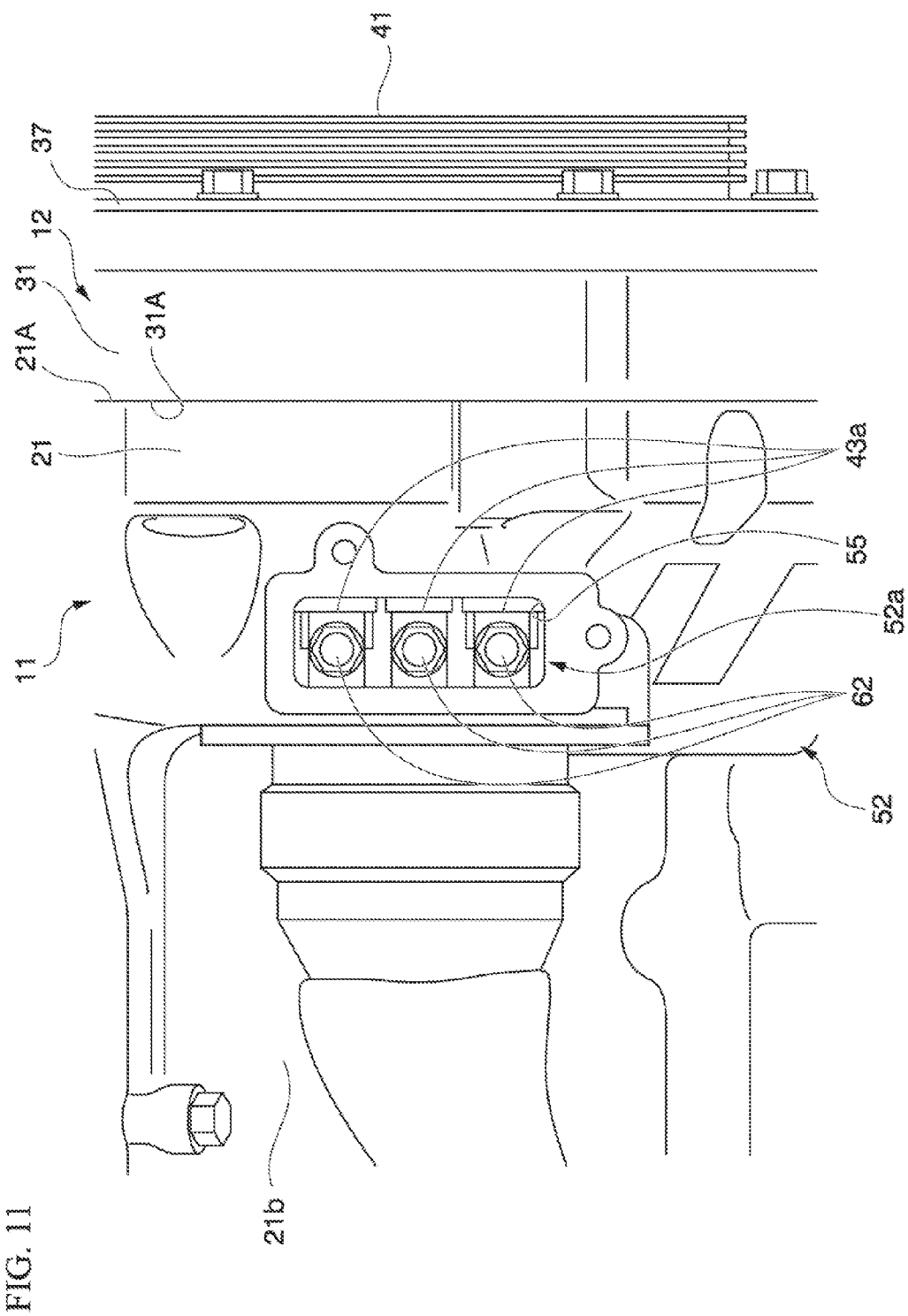
FIG. 11 is an enlarged side view illustrating the mounting part of the power supply cable provided for the internal combustion engine of the power generation apparatus according to the embodiment of the present invention.
Figure 12:
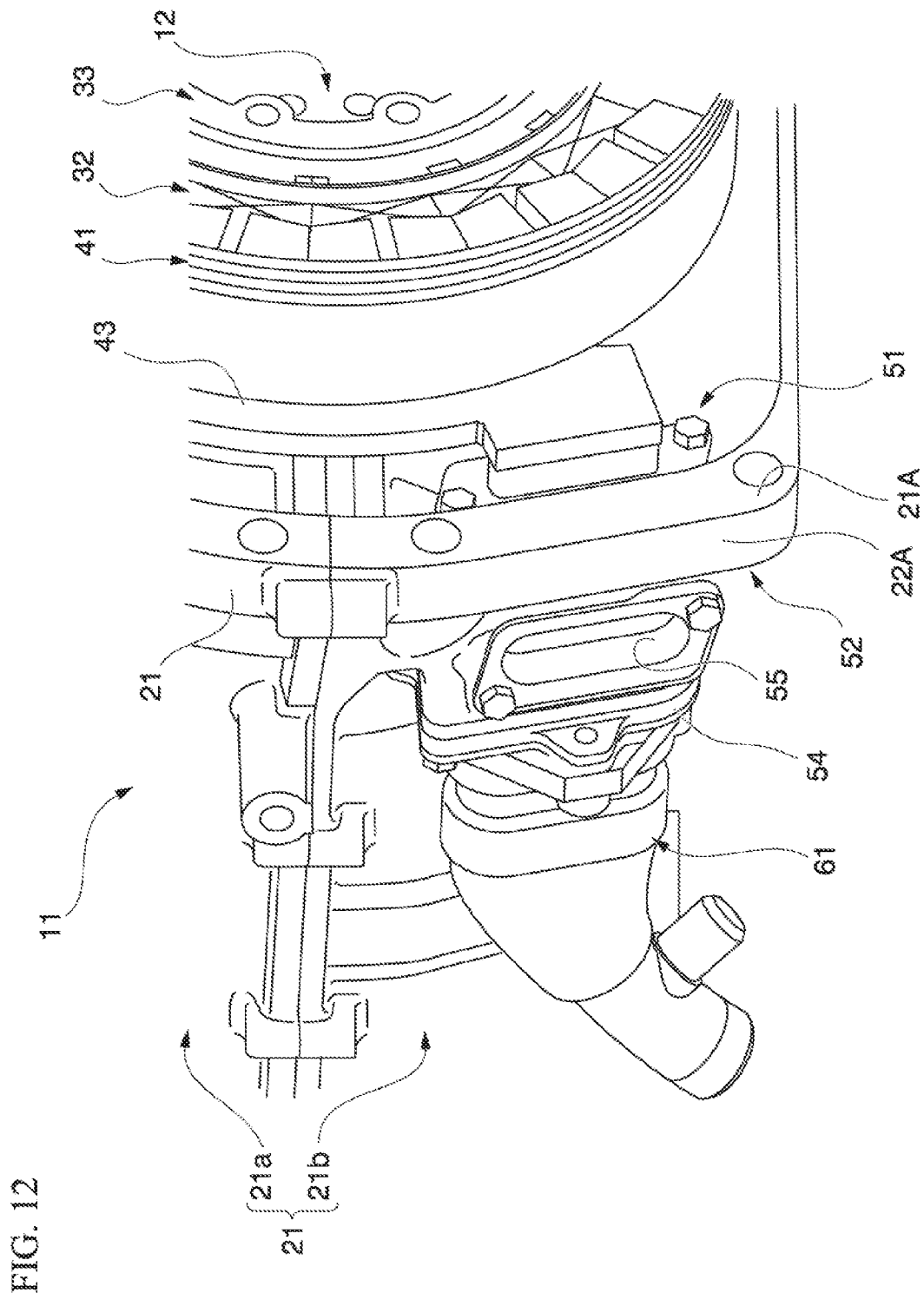
FIG. 12 is an enlarged perspective view of the mounting part of the power supply cable provided for the internal combustion engine of the power generation apparatus according to the embodiment of the present invention when viewed obliquely from a rear in the axial direction.
Figure 13:
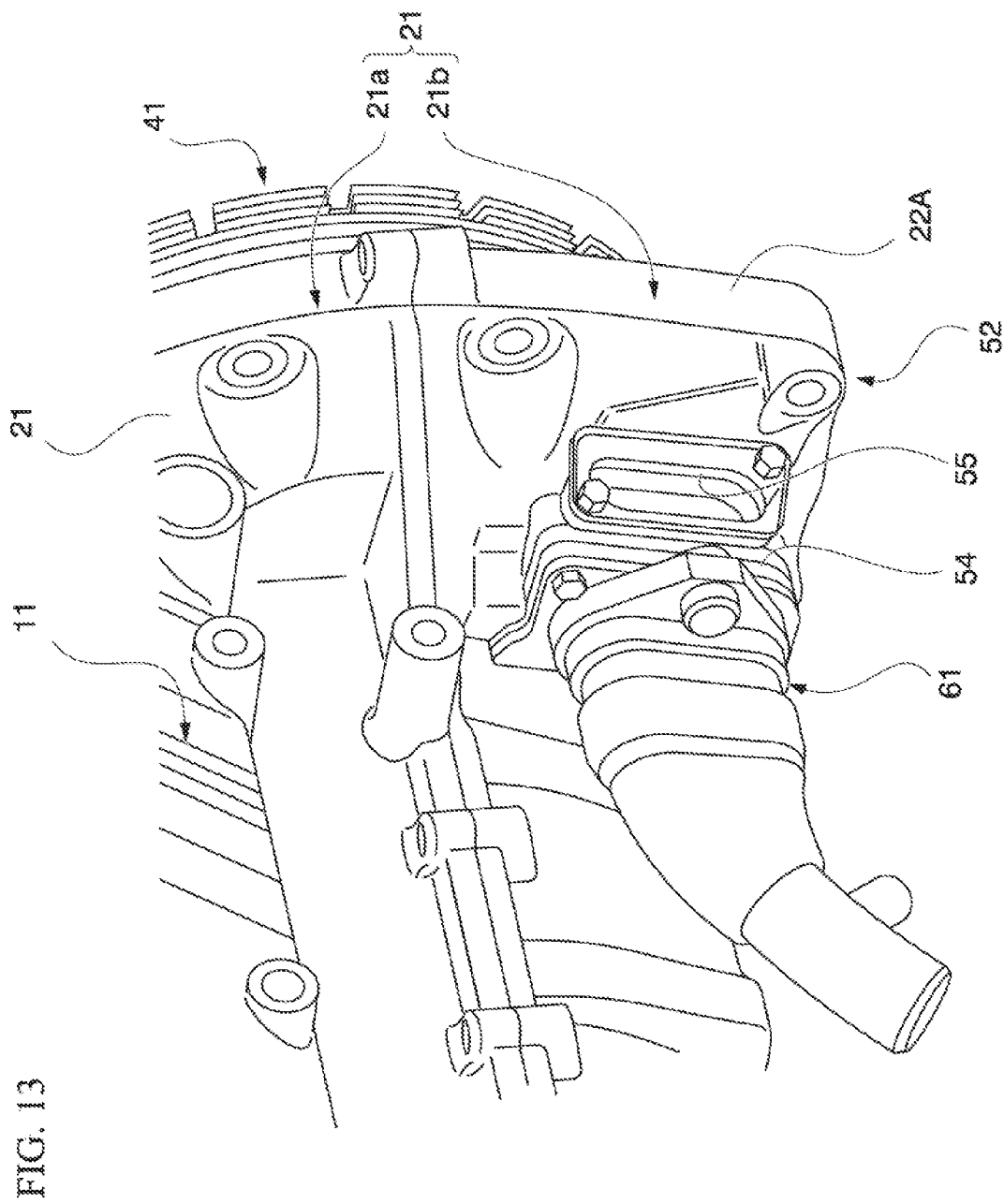
FIG. 13 is an enlarged perspective view of the mounting part of the power supply cable provided for the internal combustion engine of the power generation apparatus according to the embodiment of the present invention when viewed obliquely from a front in the axial direction.

As illustrated in FIGS. 4 and 9, the rotary electric machine 12 is equipped with the housing structure 31, a stator 32, and a rotor 33. The housing structure 31 is joined to the engine block 21 of the internal combustion engine 11, and holds the stator 32. As illustrated in FIGS. 9 and 10, the stator 32 is equipped with a plurality of stator segments 35 disposed in an annular shape, and coils 36 wound around the plurality of respective stator segments 35. The stator 32 is equipped with a holding ring 37. The plurality of stator segments 35 are press-fitted, and thereby the holding ring 37 holds outer circumferential portions of the plurality of stator segments 35, and is fixed to the housing structure 31 by, for instance, bolting. The rotor 33 is disposed at a radial inner side of the stator 32, faces the stator 32 in a radial direction thereof, and is coaxially fixed to an end of the crankshaft (not illustrated) of the internal combustion engine 11.

The rotary electric machine 12 is, for instance, a three-phase brushless DC motor. As illustrated in FIG. 10, the stator 32 is equipped with an insulating member 41, connecting members 42, and a power distribution component 43. The insulating member 41 is disposed at an axial end 32a of the stator 32 which is directed toward the transmission 13 in a circumferential direction in a state in which it insulates each of the three-phase coils 36 in each phase. The connecting members 42 are connected to each end (or coil ends) of the three-phase coils 36 held by the insulating member 41, and axially extend toward an axial end 32b of the stator 32 which is directed toward the internal combustion engine 11 at a position of a radial outer side (e.g., a vertical upper portion) of the stator 32. The power distribution component 43 is connected to each of the three-phase connecting members 42, and is, as illustrated in FIG. 9, equipped with wiring parts 43a extending from an upper portion toward a lower portion at the position of the radial outer side of the stator 32 in a circumferential direction, and terminal parts 43b connected to tips of the respective wiring parts 43a. As illustrated in FIG. 8, the power distribution component 43 causes the terminal parts 43b to protrude into a connection space 51 provided in the engine block 21 in the axial direction of the internal combustion engine 11, and is fixed inside the engine block 21.

As illustrated in FIG. 10, an axial length of an outer circumferential portion of the housing structure 31 is formed to be shorter than an axial length of the stator 32 in the axial direction of the rotary electric machine 12, and part of the stator 32 and part of the rotor 33 in the axial direction are at least disposed to protrude into an internal space of the transmission 13 or the engine block 21 of the internal combustion engine 11.

Further, as illustrated in FIG. 8, a resolver 45 for detecting a rotational angle of the rotary electric machine 12 is fixed inside the engine block 21 at a position closer to the internal combustion engine 11 than the rotor 33 in the axial direction of the internal combustion engine 11.

Figure 5:
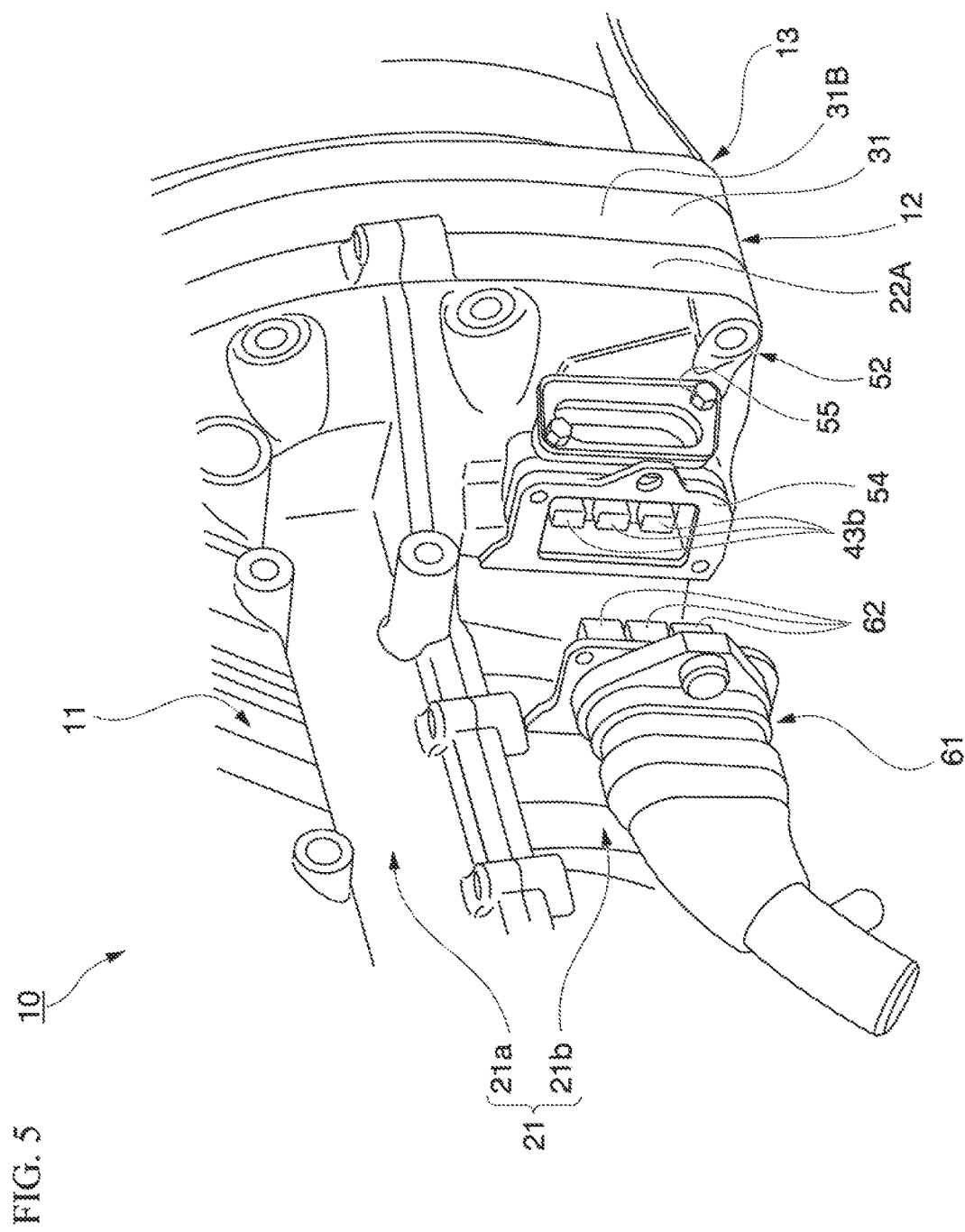
FIG. 5 is a perspective view of a mounting part of a power supply cable provided for the internal combustion engine of the power generation apparatus according to the embodiment of the present invention when viewed obliquely from the front side in the axial direction.
Figure 6:
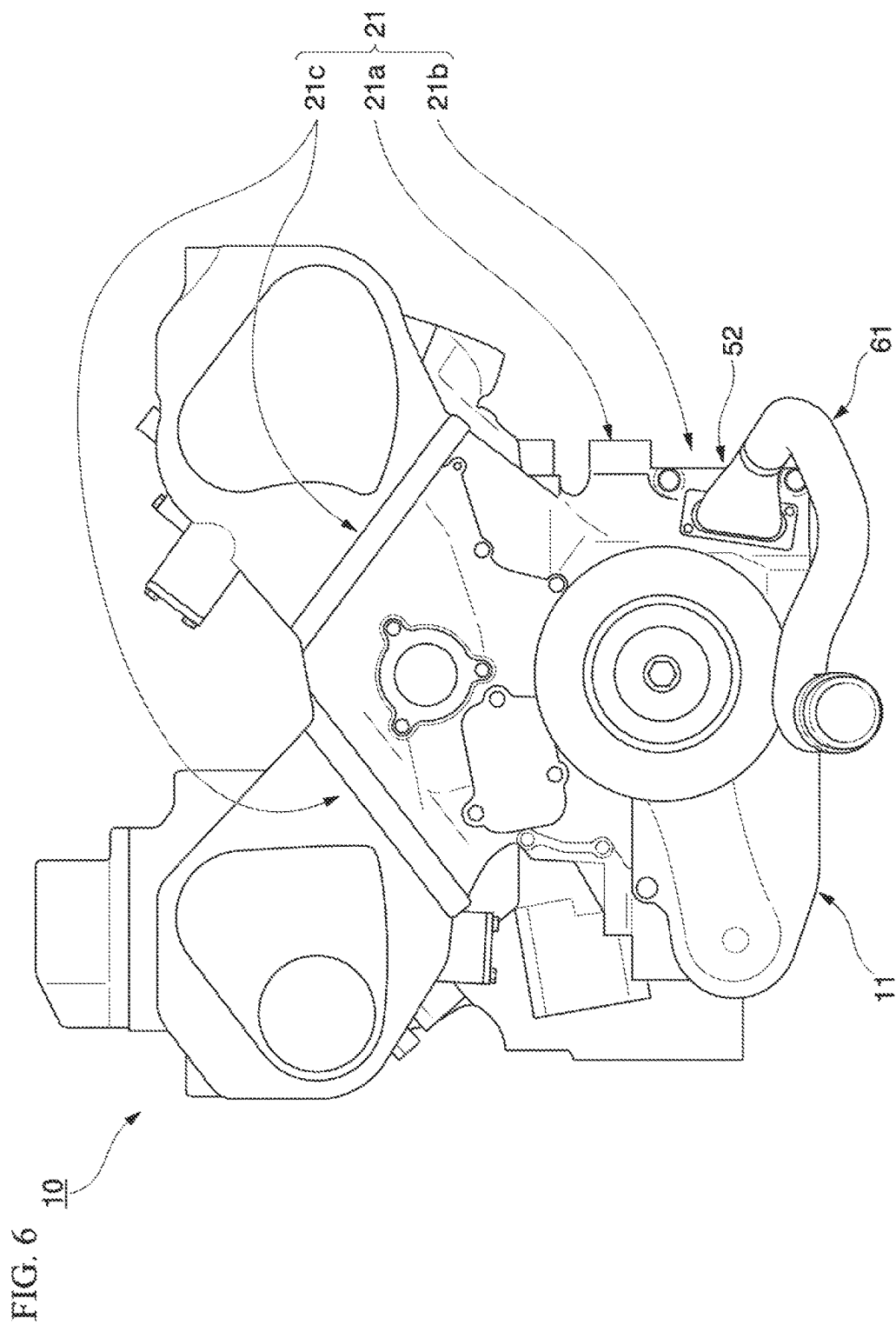
FIG. 6 is a top view of the power generation apparatus according to the embodiment of the present invention when viewed from an axial front side.

As illustrated in FIG. 5, of the pair of upper and lower blocks 21a and 21b forming the engine block 21 of the internal combustion engine 11, for example, the lower block 21b is formed with a bulge 52 in such a manner that part of an outer circumferential surface 22A of the insertion part 22 bulges to a radial outer side at an end thereof directed toward the rotary electric machine 12 in an axial direction. The bulge 52 is a bulge in the part of the outer circumferential surface 22A of the insertion part 22 having a smaller outer diameter than the housing structure 31 to an extent at which it is continuous with an outer circumferential surface 31B of the housing structure 31. As illustrated in FIG. 8, this bulge 52 is provided with a connection space 51 for connecting each of the terminal parts 43b of the power distribution component 43 of the rotary electric machine 12 and each of connection terminals 62 of a power supply cable 61 of the external power apparatus 14. When viewed in the axial direction of the internal combustion engine 11, the bulge 52 is formed at a radial outer side relative to the insertion part 22 and at a radial inner side relative to an outer edge of the joint surface 21A for the housing structure 31 of the rotary electric machine 12 joined with the engine block 21 of the internal combustion engine 11.

The connection space 51 is disposed at a position shifted from the stator 32 and the rotor 33 of the rotary electric machine 12 in the axial direction of the internal combustion engine 11. That is, when viewed in a radial direction, the connection space 51 is disposed not to overlap the stator 32 and the rotor 33 of the rotary electric machine 12 in an axial direction.

A power distribution component fixture 53 for fixing support members 43c of the terminal parts 43b of the power distribution component 43 of the rotary electric machine 12 using, for instance, bolting is provided inside the bulge 52 of the lower block 21b forming the connection space 51. Further, as illustrated in FIG. 5, the bulge 52 is provided with a power supply cable fixture 54 for being open to an axial front side facing the terminal parts 43b fixed to the power distribution component fixture 53 and fixing the power supply cable 61 using, for instance, bolting. Thereby, the power supply cable 61 is disposed around the internal combustion engine 11 in an axial direction, and is inserted into the connection space 51 in the axial direction of the internal combustion engine 11. Thus, each of the terminal parts 43b fixed to the power distribution component fixture 53 and each of the connection terminals 62 of the power supply cable 61 fixed to the power supply cable fixture 54 are electrically connected in the connection space 51.

As illustrated in FIGS. 11 to 14, the bulge 52 is equipped with a window part 55 that is open at an outer location radially facing connection parts 52a between the terminal parts 43b and the connection terminals 62 of the power supply cable 61. Thereby, each of the terminal parts 43b and each of the connection terminals 62 of the power supply cable 61 is, for example, fixed by, for instance, bolting with a bolt 63 inserted from the window part 55.

Figure 14:
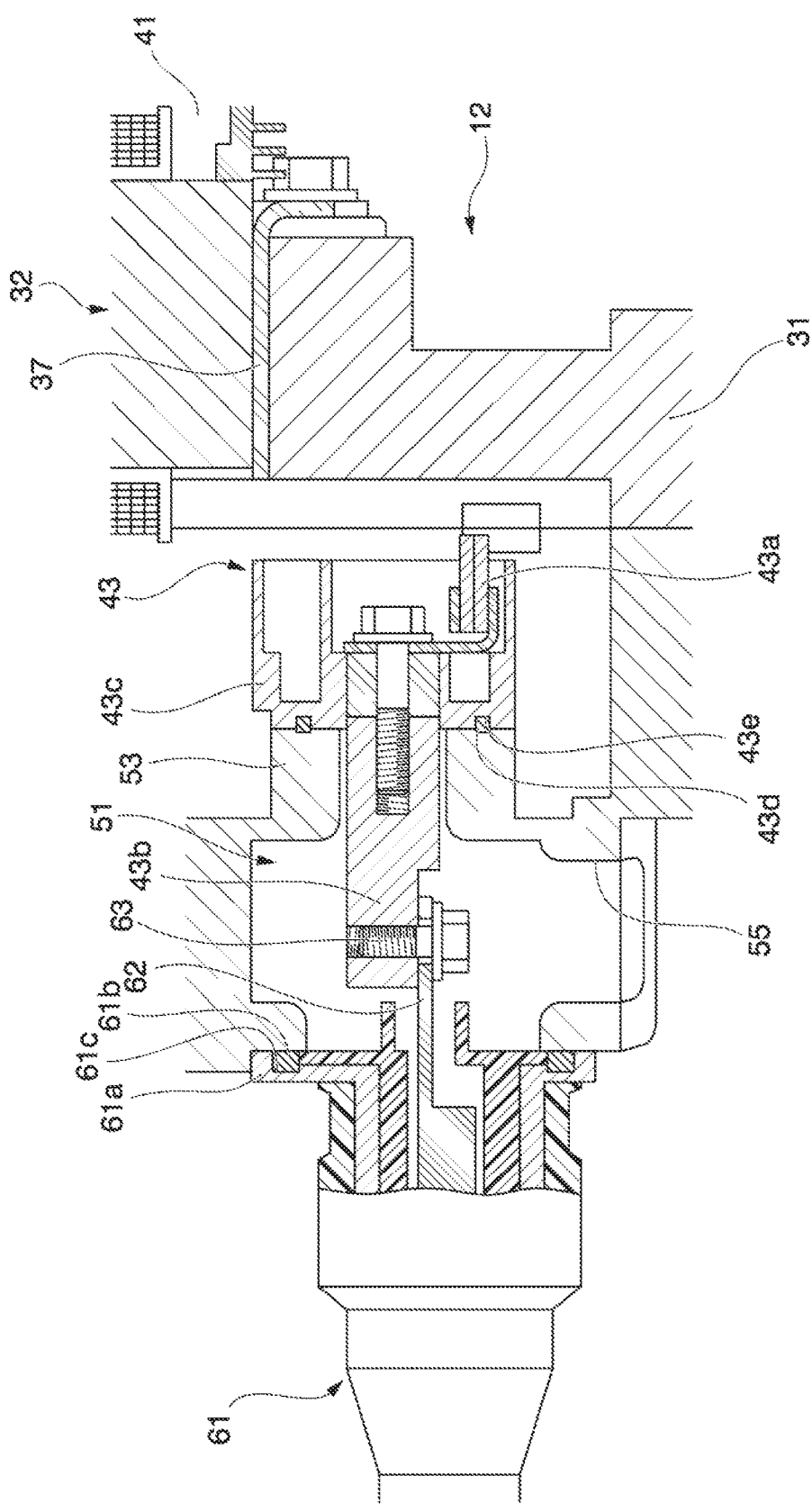
FIG. 14 is a sectional view of the mounting part of the power supply cable provided for the internal combustion engine of the power generation apparatus according to the embodiment of the present invention.

As illustrated in FIG. 14, the support member 43c of each of the terminal parts 43b of the power distribution component 43 is equipped with a seal groove 43e in which a seal member 43d is mounted, and a space between the power distribution component fixture 53 and the support member 43c is liquid-tightly sealed by this seal member 43d. Also, a tip 61a of the power supply cable 61 fixed to the power supply cable fixture 54 is equipped with a seal move 61c in which a seal member 61b is mounted, and a space between the power supply cable fixture 54 and the tip 61a of the power supply cable 61 is liquid-tightly sealed by this seal member 61b. Also, after each of the terminal parts 43b of the power distribution component 43 and each of the connection terminals 62 of the power supply cable 61 are fixed, the window part 55 may be sealed by a lid (or a seal member) 64 that liquid-tightly blocks this window part 55. Thereby, the connection space 51 is sealed against the outside.

As described above, according to the power generation apparatus 10 of the present embodiment, since the connection space 51 is formed in part of the internal combustion engine 11, an increase in an axial dimension of the power generation apparatus 10 can be suppressed.

That is, a predetermined width (a length in a connecting direction or a length in a direction in which, for instance, a tool gains access to the connection space 51) is required for the connection space 51 for connecting each of the terminal parts 43b of the power distribution component 43 and each of the connection terminals 62 of the power supply cable 61. For this reason, for example, when the connection space 51 is provided at the outer circumferential portion of the housing structure 31 of the rotary electric machine 12, a width of this housing structure 31 is equal to or greater than a predetermined value, and an axial or radial size of the entire power generation apparatus 10 increases.

In contrast, as the connection space 51 is formed in part of the internal combustion engine 11, a space directed toward the internal combustion engine 11 can be efficiently used as provide the connection space 51, and an increase in size of the housing structure 31 of the rotary electric machine 12 can be suppressed.

For example, since the housing structure 31 of the rotary electric machine 12 has a circular shape in an axial cross section, there is a need to provide the connection space 51 for the outer circumferential portion or the axial end of the housing structure 31, and a radial or axial length inevitably increases. In contrast, instead of the engine block 21 of the internal combustion engine 11 having a circular shape in the axial cross section, when there is a space in which the connection space 51 can be disposed on an inward region relative to a radial outer edge of the housing structure 31 of the rotary electric machine 12, this space can be effectively used as dispose the connection space 51.

In particular, since the connection space 51 can be formed using a space that is present due to a difference in outer diameter between the insertion part 22 and the housing structure 31 of the rotary electric machine 12 within a space around the insertion part 22 of the crankshaft of the internal combustion engine 11, the internal combustion engine 11 and the rotary electric machine 12 can be inhibited from growing in radial size.

Further, since the power supply cable 61 can be disposed around the internal combustion engine 11 in an axial direction, the power generation apparatus 10 even including the power supply cable 61 can be inhibited from growing in size, for example, compared to the case in which the power supply cable 61 is disposed in a radial direction.

Further, the connection space 51 can be prevented from overlapping the stator 32 and the rotor 33 of the rotary electric machine 12 in an axial direction when viewed in a radial direction, and the rotary electric machine 12 can be inhibited from growing in radial size.

Further, each of the terminal parts 43b of the power distribution component 43 and each of the connection terminals 62 of the power supply cable 61 can be easily connected and fixed because they can gain access to the connection space 51 through the window part 55.

Further, when an exhaust heat system component of the internal combustion engine 11 is disposed at the side of the upper block 21a of the engine block 21, a thermal action which the power supply cable 61 receives from the exhaust heat system component can be suppressed because the connection space 51 is provided for the lower block 21b.

Further, since the connection space 51 is liquid-tightly sealed against the outside, the connection parts between the terminal parts 43b of the power distribution component 43 and the connection terminals 62 of the power supply cable 61 can be prevented from being covered with fluid.

In the aforementioned embodiment, the connection space 51 is provided for the lower block 21b. However, without being limited thereto, the connection space 51 may be provided at an appropriate position of the engine block 21 such as the upper block 21a.

(Modification)

In the aforementioned embodiment, the stator 32 may be held by the engine block 21 by omitting the housing structure 31 of the rotary electric machine 12.

Figure 15:
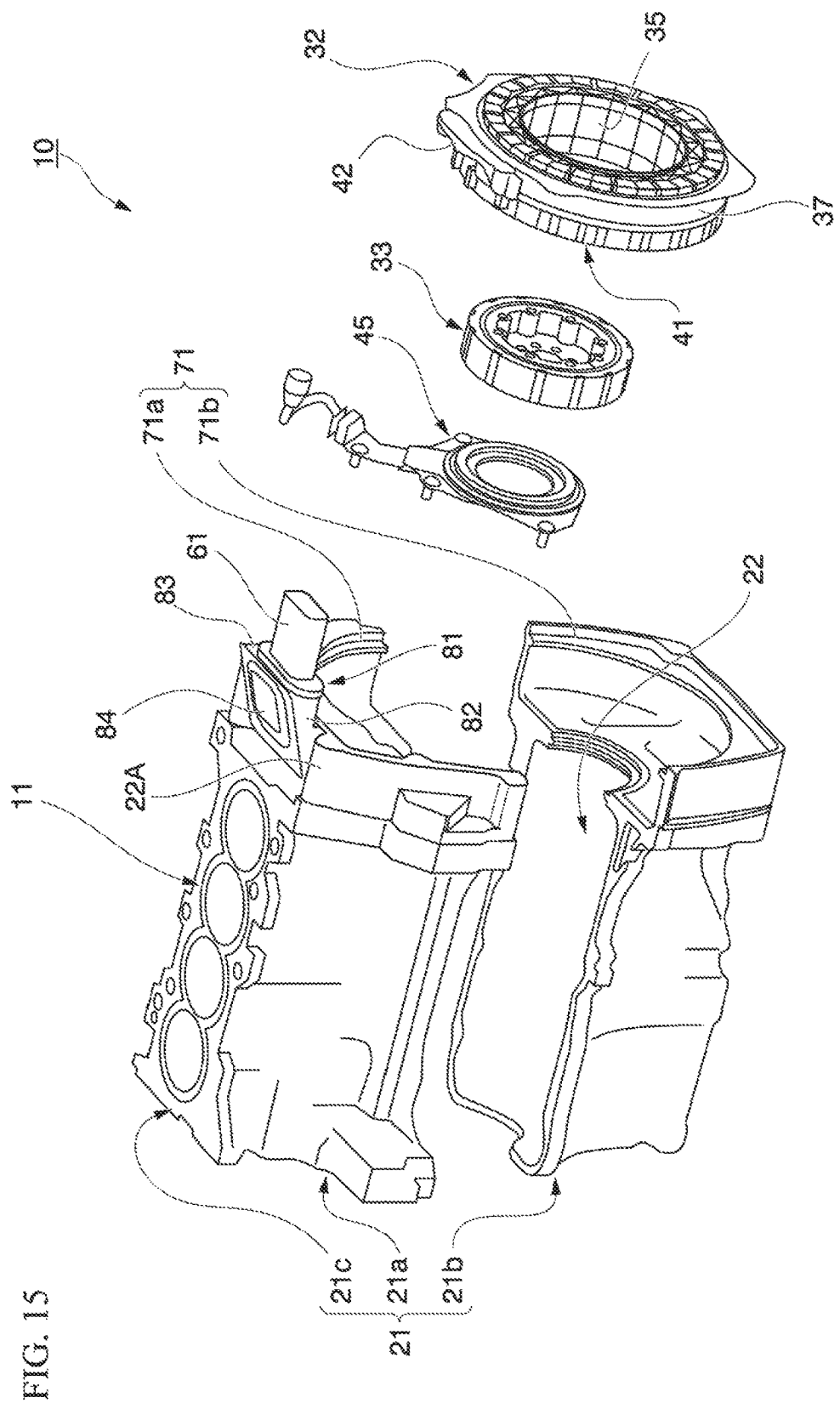
FIG. 15 is an exploded perspective view illustrating an internal combustion engine and a motor of a power generation apparatus according to a modification of the embodiment of the present invention.
Figure 16:
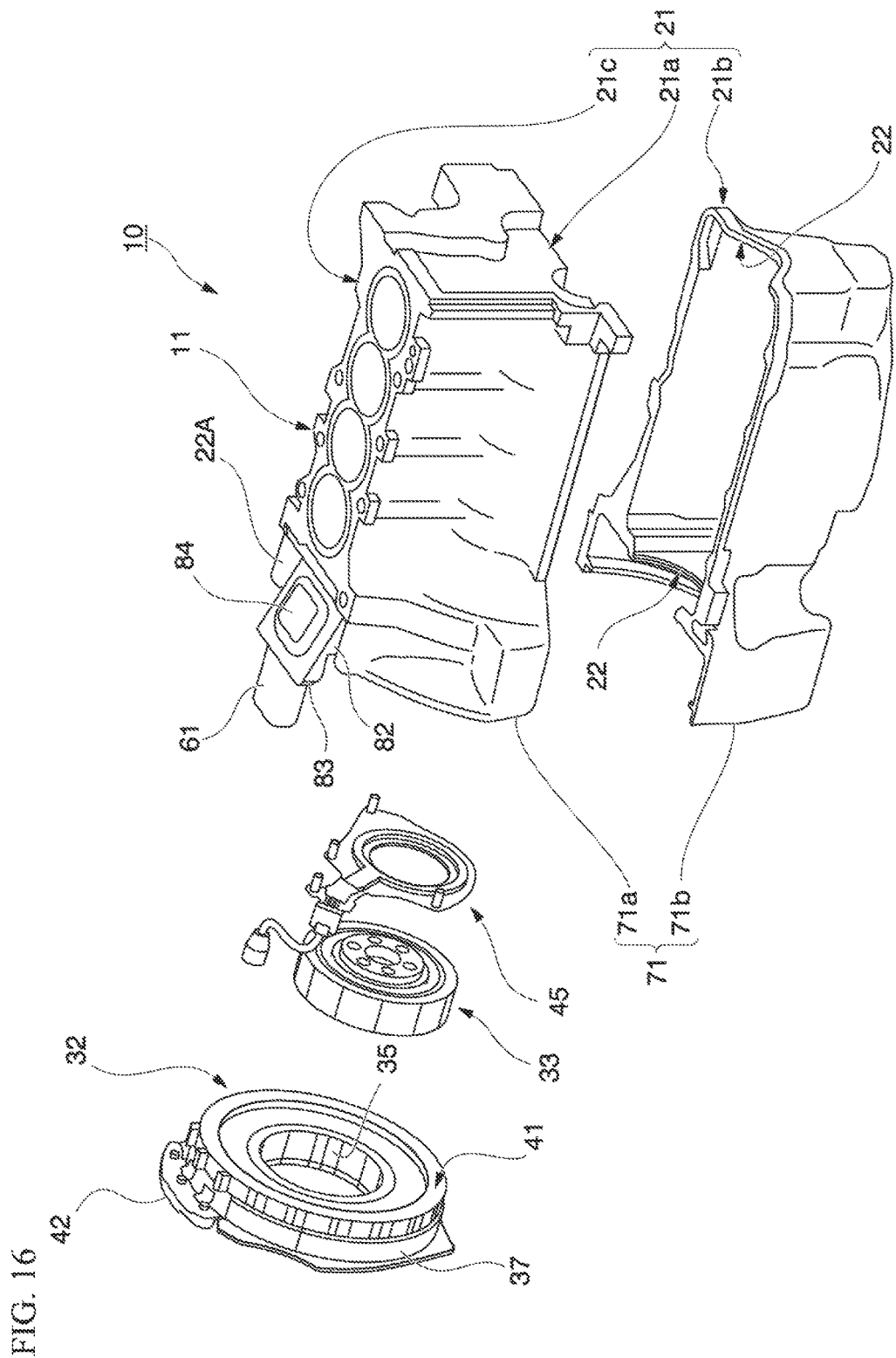
FIG. 16 is an exploded perspective view illustrating the internal combustion engine and the motor of the power generation apparatus according to the modification of the embodiment of the present invention.
Figure 17:
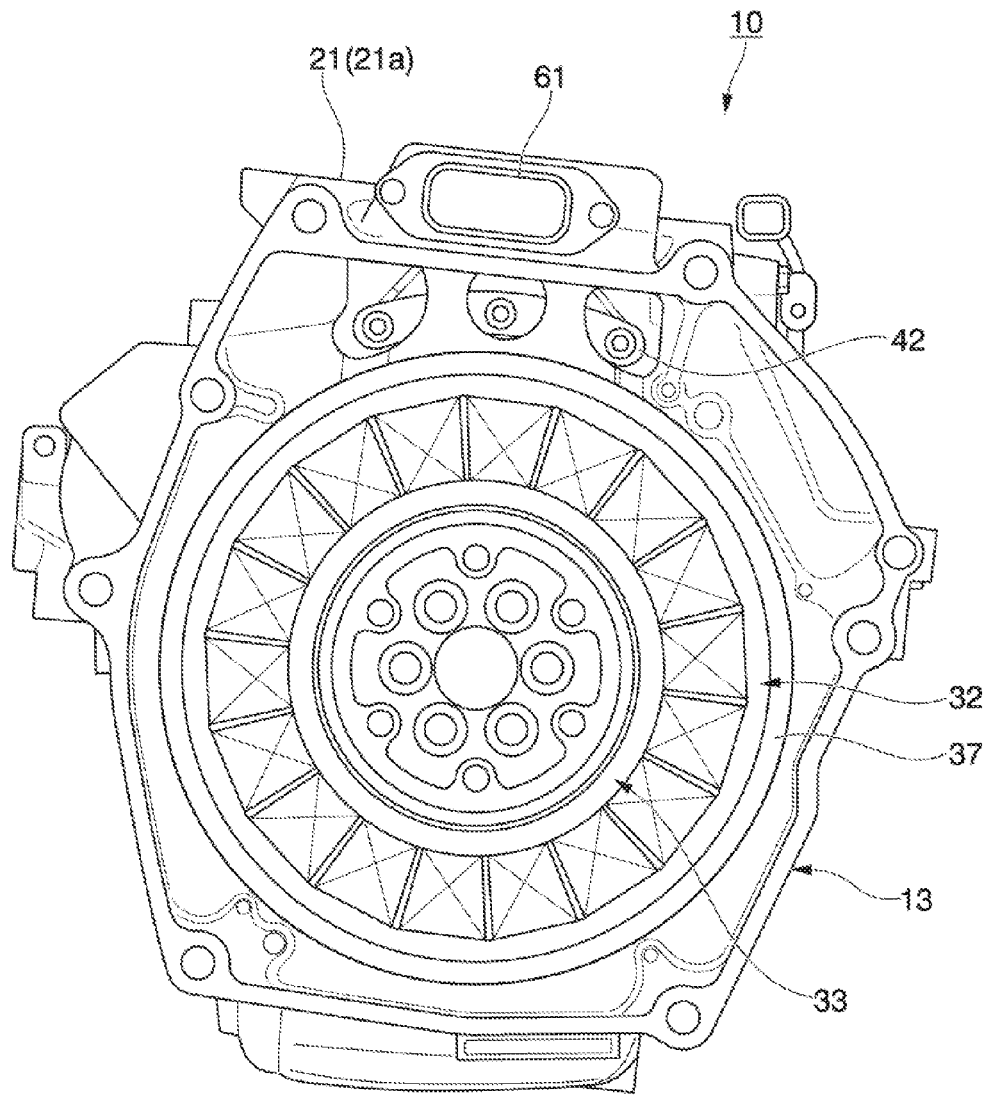
FIG. 17 is a top view of a mounting part of a three-phase cable provided for the internal combustion engine of the power generation apparatus according to the modification of the embodiment of the present invention when viewed in an axial direction.

For example, an engine block 21 of an internal combustion engine 11 of a power generation apparatus 10 according to a modification of the aforementioned embodiment illustrated in FIGS. 15 to 17 is equipped with a rotary electric machine container 71 configured to protrude from an end thereof adjacent to a rotary electric machine 12 in an axial direction of an insertion part 22 to be able to house a stator 32 and a rotor 33. In this case, a transmission 13 is disposed adjacent to the rotary electric machine container 71 of the engine block 21 in an axial direction of the internal combustion engine 11.

The rotary electric machine container 71 is equipped with an upper container 71a and a lower container 71b that are integrally provided for an upper block 21a and a lower block 21b, respectively. A holding ring 37 holding a plurality of stator segments 35 is fixed inside the rotary electric machine container 71 by, for instance, bolting, and thereby the rotary electric machine 12 housed in this rotary electric machine container 71 is fixed to the engine block 21. The rotary electric machine 12 causes connecting members 42 connected to respective ends (or coil ends) of three-phase coils 36 to protrude to a radial outer side (e.g., a vertical upper side) of the stator 32 with an insulating member 41 holding the three-phase coils 36 directed toward the internal combustion engine 11. Thereby, the rotary electric machine 12 housed in this rotary electric machine container 71 causes the connecting members 42 to protrude into a connection space 81 provided for the upper container 71a of the engine block 21.

Of the upper and lower containers 71a and 71b forming the rotary electric machine container 71, for example, the upper container 71a is formed with a bulge 82 in such a manner that part of an outer circumferential surface 22A of the insertion part 22 bulges to a radial outer side (e.g., a vertical upper side) at an end thereof directed toward the transmission 13 in an axial direction. The connection space 81 that can house each of the connecting members 42 of the rotary electric machine 12 is formed in this bulge 82. The bulge 82 forming the connection space 81 is provided with a power supply cable fixture 83 for being open to an axial rear side (i.e. a side of the transmission 13) facing each of the connecting members 42 of the rotary electric machine 12 fixed to the rotary electric machine container 71 and fixing a power supply cable 61 using, for instance, bolting. Thereby, the power supply cable 61 is disposed around the transmission 13 in an axial direction, and is inserted into the connection space 81 in the axial direction of the transmission 13. Thus, each of the connecting members 42 of the rotary electric machine 12 and each of connection terminals 62 of the power supply cable 61 fixed to the power supply cable fixture 83 are electrically connected in the connection space 81.

The bulge 82 is equipped with a window part (not illustrated) that is open at an outer location radially facing connection parts between the connecting members 42 of the rotary electric machine 12 and the connection terminals 62 of the power supply cable 61. Thereby, each of the connecting members 42 of the rotary electric machine 12 and each of the connection terminals 62 of the power supply cable 61 is, for example, fixed by, for instance, bolting with a bolt inserted from the window part. This window part may be blocked by a lid 84.

According to this modification, no dedicated housing is required for the rotary electric machine 12, various sensors and the like required for the rotary electric machine 12 are directly mounted on the engine block 21, and a function of the housing of the rotary electric machine 12 is integrated into the engine block 21. Thereby, the number of components can be reduced. Further, a special constitution is inhibited from being required for the rotary electric machine 12 connected to the internal combustion engine 11, so that common use of the rotary electric machine 12 with different types of internal combustion engines 11 can be promoted. Furthermore, it is possible to improve rigidity of the power generation apparatus 10. In addition, the rotary electric machine 12 can also be cooled by a cooling medium cooling the internal combustion engine 11, and a constitution required to cool the internal combustion engine 11 and the rotary electric machine 12 can be simplified.

The aforementioned embodiment is given by way of example and is not intended to limit the scope of the invention. The aforementioned novel embodiment can be carried out in various other forms, and various omissions, substitutions, and variations are possible without departing from the spirit of the present invention.

For example, in the aforementioned embodiment, the drive wheels of the hybrid vehicle 1 in which the power generation apparatus 10 is mounted are set as the rear wheels. However, without being limited thereto, front wheels may be set as the drive wheels.

In addition, although it has been described that the internal combustion engine 11, the rotary electric machine 12, and the transmission 13 are arranged in parallel in the vehicle longitudinal direction in the power generation apparatus 10 of the aforementioned embodiment, these components are not limited thereto but may be arranged in an appropriate direction such as a vehicle transverse direction.

REFERENCE SIGNS LIST

10: power generation apparatus
11: internal combustion engine
12: rotary electric machine
14: power apparatus (power supply device)
21a: upper block
21b: lower block
21A: joint surface
22: insertion part
22A: outer circumferential surface
31: housing structure (housing)
32: stator
33: rotor
36: coil
43b: terminal part (coil terminal)
51: connection space
52: bulge
52a: connection part
55: window part
61: power supply cable
62: connection terminal
82: bulge

The invention claimed is:

1. A power generation apparatus comprising:
an internal combustion engine; and
a rotary electric machine disposed adjacent to the internal combustion engine in an axial direction,
wherein the rotary electric machine includes coils to which an electric current is supplied from an external power supply device via a power supply cable,
coil terminals connected to the coils and connection terminals of the power supply cable are connected in a predetermined connection space formed in part of the internal combustion engine,
the internal combustion engine includes an insertion part of a crankshaft which is configured by a pair of upper and lower blocks,
part of an outer circumferential surface of the insertion part bulges to a radial outer side and forms a bulge,
the connection space is formed in the bulge, and
when viewed in the axial direction, the bulge is formed at a radial outer side relative to the insertion part and at a radial inner side relative to an outer edge of a joint surface for another housing joined with the internal combustion engine.

2. The power generation apparatus according to claim 1, wherein the power supply cable is inserted into the connection space in the axial direction.

3. The power generation apparatus according to claim 1, wherein:
the rotary electric machine includes a stator around which the coils are wound and a rotor configured to face the stator in a radial direction; and
the connection space is disposed at a position shifted from the stator and the rotor in the axial direction.

4. The power generation apparatus according to claim 1, wherein the connection space includes a window part configured to open at a location facing connection parts between the coil terminals and the connection terminals of the power supply cable.

5. The power generation apparatus according to claim 1, wherein the connection space is formed in the lower block of the internal combustion engine.

6. The power generation apparatus according to claim 5, wherein the connection space is sealed against an outside by a seal member.

7. The power generation apparatus according to claim 1, wherein the rotary electric machine is housed in part of the internal combustion engine.

8. A power generation apparatus comprising:
an internal combustion engine; and
a rotary electric machine disposed adjacent to the internal combustion engine in an axial direction, wherein the rotary electric machine includes coils to which an electric current is supplied from an external power supply device via a power supply cable, coil terminals connected to the coils and connection terminals of the power supply cable are connected in a predetermined connection space formed in part of the internal combustion engine, the internal combustion engine includes an insertion part of a crankshaft which is configured by a pair of upper and lower blocks, part of an outer circumferential surface of the insertion part bulges to a radial outer side and forms a bulge, the connection space is formed in the bulge, and the connection space is formed in the lower block of the internal combustion engine.

9. A power generation apparatus comprising:

an internal combustion engine; and a rotary electric machine disposed adjacent to the internal combustion engine in an axial direction, wherein the rotary electric machine includes coils to which an electric current is supplied from an external power supply device via a power supply cable, coil terminals connected to the coils and connection terminals of the power supply cable are connected in a predetermined connection space formed in part of the internal combustion engine, the internal combustion engine includes an insertion part of a crankshaft which is configured by a pair of upper and lower blocks, part of an outer circumferential surface of the insertion part bulges to a radial outer side and forms a bulge, the connection space is formed in the bulge, the connection space is formed in the lower block of the internal combustion engine, and the connection space is sealed against an outside by a seal member.

* * * * *